United States Patent
Hasegawa et al.

(10) Patent No.: US 6,313,240 B1
(45) Date of Patent: *Nov. 6, 2001

(54) PROCESS FOR PRODUCING ETHYLENE/α-OLEFIN COPOLYMER

(75) Inventors: Saiki Hasegawa, Yokkaichi; Makoto Sone; Hisami Yasuda, both of Mie-ken; Akihiro Yano, Yokkaichi, all of (JP)

(73) Assignee: Tosoh Corporation, Shinnanyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/198,579

(22) Filed: Feb. 18, 1994

(30) Foreign Application Priority Data

Feb. 22, 1993 (JP) .................................... 5-032008

(51) Int. Cl.⁷ ................................ C08F 4/52; C08F 4/642
(52) U.S. Cl. ...................... 526/133; 526/132; 526/160; 526/943
(58) Field of Search .................... 526/132, 133, 526/160, 943

(56) References Cited

U.S. PATENT DOCUMENTS

| | | | |
|---|---|---|---|
| 4,935,474 | * 6/1990 | Ewen et al. ........................ | 526/160 |
| 5,084,534 | * 1/1992 | Welborn et al. ...................... | 526/160 |
| 5,324,800 | * 6/1994 | Welborn et al. ...................... | 526/127 |
| 5,408,017 | * 4/1995 | Turner et al. ........................ | 526/160 |
| 5,444,134 | * 8/1995 | Matsumoto .......................... | 526/159 |

FOREIGN PATENT DOCUMENTS

| | | | |
|---|---|---|---|
| 277004 | * 8/1988 | (EP) . | |
| 513380 | * 11/1992 | (EP) . | |
| WO 91/14713 | 10/1991 | (WO) . | |
| WO93/25590 | * 12/1993 | (WO) . | |

* cited by examiner

*Primary Examiner*—David W. Wu
*Assistant Examiner*—R. Rabago
(74) *Attorney, Agent, or Firm*—Oblon, Spivak, McClelland, Maier & Neustadt, P.C.

(57) ABSTRACT

A process for producing an ethylene/α-olefin copolymer is provided in which ethylene is copolymerized with an α-olefin having three or more carbons by use of an olefin polymerization catalyst at a polymerization temperature of not lower than 120° C. The olefin polymerization catalyst comprises, as constitutional components, a) a metallocene compound comprising hafnium, b) an ionizing ionic compound, and c) an organoaluminum compound, the ionizing ionic compound (b) being a compound which is capable of changing the metallocene compound (a) into a cationic form and does not further react the cationic form of the metallocene compound.

2 Claims, No Drawings

PROCESS FOR PRODUCING ETHYLENE/α-OLEFIN COPOLYMER

BACKGROUND OF THE INVENTION

1. Field of the Invention

The present invention relates to a process for producing an ethylene/α-olefin copolymer with an olefin polymerization catalyst constituted of a metallocene compound, an organoaluminum compound, and an ionizable ionic compound.

2. Description of the Related Art

The low-pressure Ziegler process for polymerization of ethylene or an α-olefin is well known in the related technical fields. The catalyst for the process is generally prepared by treating a mixture of an organometallic compound or hydride of a metal of Group 1A to 3A of Periodic Table with a compound of a transition metal (Group 3B to 2B of Periodic Table) in a suspension or a solution, or in the absence of a solvent or a diluent.

In recent years, special kinds of catalysts are being developed which are active in olefin polymerization. Examples of the catalyst are combination of a cyclopentadienyl derivative of a metal such as titanium, zirconium, and hafnium (Group 4B of Periodic Table) with aluminoxane. (See, for example, J. Boor: "Ziegler-Natta Catalyst and Polymerization", Academic Press, New York (1979), and H. Sinn and W. Kaminsky: Adv. Organomet. Chem. 1899 (1980).) These catalysts have ability of forming a stereospecific olefin polymer with high catalyst activity.

Nevertheless, such catalysts have not been used industrially mainly because of the following reasons: the aluminoxane cannot readily be produced in a reproducible form, hindering preparation of the catalyst and the polymer with required reproducibility, and the expensive aluminoxane has to be used in a considerably high ratio to the transition metal compound to achieve sufficient activity.

To offset the above disadvantages, Japanese Patent Laid-Open No. 3-207704 discloses ionic metallocene compound prepared by reacting a metallocene with an ionizing ionic compound. PCT Patent Application WO 92/01723 discloses a process of α-olefin polymerization by use of a catalyst system prepared by reacting a halogenated metallocene with an organometallic compound and then bringing the reaction product into contact with an ionizing ionic compound. This catalyst system is advantageous in olefin polymerization. However, when ethylene and α-olefin are copolymerized by use of such a catalyst at a high temperature, the resulting copolymer has a low molecular weight disadvantageously.

Japanese Patent Application Laid-Open No. 60-217209 discloses production of a high-molecular-weight olefin polymer by use of a catalyst comprising a hafnium compound as the metallocene component. In copolymerization of ethylene with α-olefin, however, this catalyst is much less active than the catalyst having zirconium as the ligand, and is disadvantageous in production efficiency of the copolymer.

The inventors of the present invention made comprehensive studies to solve the above problems, and found that an ethylene/α-olefin copolymer is obtained with a high catalyst activity by copolymerizing ethylene with α-olefin by use of a specific ionic metallocene catalyst at a temperature of not lower than 120° C. The present invention has been accomplished based on the above findings.

SUMMARY OF THE INVENTION

The present invention intends to provide a process for producing ethylene/α-olefin copolymer of high molecular weight with high efficiency at a high temperature.

The present invention provides a process for producing an ethylene/α-olefin copolymer by copolymerization of ethylene with an α-olefin having three or more carbons by use of an olefin polymerization catalyst at a polymerization temperature of not lower than 120° C., the olefin polymerization catalyst comprising, as constitutional components, a) a metallocene compound, b) an ionizing ionic compound, and c) an organoaluminum compound: the metallocene compound (a) being a hafnium compound represented by the general formula (1) or (2):

(1)

(2)

wherein $Cp^1$ and $Cp^2$ are independently a substituted or unsubstituted cyclopentadienyl group; idenyl group or fluorenyl group; $R^1$ is a substituted or unsubstituted lower alkylene group, a dialkylsilanediyl group, a dialkylgermanediyl group, an alkylphosphinediyl group, or an alkylimino group, $R^1$ crosslinking $Cp^1$ and $Cp^2$ together; $R^2$ and $R^3$ are independently a hydrogen atom, a halogen atom, a hydrocarbon group an alkoxy group, or an aryloxy group of 1 to 12 carbons, the ionizing ionic compound (b) being a compound which is capable of changing the metallocene compound (a) into a cationic form and does not further react the cationic form of the metallocene compound, and the organoaluminum compound (c) being represented by the general formula (3):

(3)

wherein $R^4$, $R^{4'}$, and $R^{4''}$ are independently a hydrogen atom, a halogen atom, an amino group, an alkyl group, an alkoxy group, or an aryl group, at least one thereof being an alkyl group.

DETAILED DESCRIPTION OF THE PREFERRED EMBODIMENT

The metallocene compound (a) used in the present invention is a hafnium compound represented by the general formula (1) or (2). The metallocene compound is exemplified specifically by bis(cyclopentedienyl)hafnium dichloride,
bis(methylcyclopentedienyl)hafnium dichloride,
bis(butylcyclopentedienyl)hafnium dichloride,
ethylenebis(indenyl)hafnium dichloride,
dimethylsilanediylbis(2,4,5-trimethylcyclopentadienyl) hafnium dichloride,
dimethylsilanediylbis(3-methylcyclopentadienyl)hafnium dichloride,
dimethylsilanediylbis(4-t-butyl,2-methylcyclopentadienyl) hafnium dichloride,
diethylsilanediylbis(2,4,5-trimethylcyclopentadienyl) hafnium dichloride, diethylsilanediylbis(2,4-dimethylcyclopentadienyl)hafnium dichloride,
diethylsilanediylbis(3-methylcyclopentadienyl)hafnium dichloride,
diethylsilanediylbis(4-t-butyl,2-methylcyclopentadienyl) hafnium dichloride,
isopropylidene(cyclopentadienyl)(fluorenyl)hafnium dichloride,
diphenylmethylene(cyclopentadienyl)(fluorenyl)hafnium dichloride,
methylphenylmethylene(cyclopentadienyl)(fluorenyl) hafnium dichloride,
isopropylidene(cyclopentadienyl)(2,7-di-t-butylfluorenyl) hafnium dichloride,
diphenylmethylene(cyclopentadienyl)(2,7-di-t-butylfluorenyl)hafnium dichloride,
methylphenylmethylene(cyclopentadienyl)(2,7-di-t-butylfluorenyl)hafnium dichloride,
isopropylidenebis(cyclopentadienyl)hafnium dichloride,
diphenylmethylenebis(cyclopentadienyl)hafnium dichloride,
methylphenylmethylenebis(cyclopentadienyl)hafnium dichloride,
isopropylidene(cyclopentadienyl) (tetramethylcyclopentadienyl)hafnium dichloride,
diphenylmethylene(cyclopentadienyl) (tetramethylcyclopentadienyl)hafnium dichloride,
isopropylidenebis(indenyl)hafnium dichloride,
diphenylmethylenebis(indenyl)hafnium dichloride,
methylphenylmethylenebis(indenyl)hafnium dichloride, and the like, but is not limited thereto.

The ionizing ionic compound (b) used in the present invention is a compound which is capable of making the aforementioned metallocene compound (a) cationic, and does not reacts further the formed cationic metallocene compound. The ionizing ionic compound is exemplified specifically by boron compounds such as
tri(n-butyl)ammonium tetrakis(p-tolyl)borate,
tri(n-butyl)ammonium tetrakis(m-tolyl)borate,
tri(n-butyl)ammonium tetrakis(2,4-dimetylphenyl)borate,
tri(n-butyl)ammonium tetrakis(3,5-dimethylphenyl)borate,
tri(n-butyl)ammonium tetrakis(pentafluorophenyl)borate,
N,N-dimethylanilinium tetrakis(p-tolyl)borate,
N,N-dimethylanilinium tetrakis(m-tolyl)borate,
N,N-dimethylanilinium tetrakis(2,4-dimetylphenyl)borate,
N,N-dimethylanilinium tetrakis(3,5-dimethylphenyl)borate,
N,N-dimethylanilinium tetrakis(pentafluorophenyl)borate,
triphenylcarbenium tetrakis(p-tolyl)borate,
triphenylcarbenium tetrakis(m-tolyl)borate,
triphenylcarbenium tetrakis(2,4-dimetylphenyl)borate,
triphenylcarbenium tetrakis(3,5-dimethylphenyl)borate,
triphenylcarbenium tetrakis(pentafluorophenyl)borate,
tropylium tetrakis(p-tolyl)borate,
tropylium tetrakis(m-tolyl)borate,
tropylium tetrakis(2,4-dimetylphenyl)borate,
tropylium tetrakis(3,5-dimethylphenyl)borate,
tropylium tetrakis(pentafluorophenyl)borate,
lithium tetrakis(pentafluorophenyl)borate,
lithium tetrakis(phenyl)borate,
lithium tetrakis(p-tolyl)borate,
lithium tetrakis(m-tolyl)borate,
lithium tetrakis(2,4-dimetylphenyl)borate,
lithium tetrakis(3,5-dimethylphenyl)borate,
lithium tetrafluoroborate,
sodium tetrakis(pentafluorophenyl)borate,
sodium tetrakis(phenyl)borate,
sodium tetrakis(p-tolyl)borate,
sodium tetrakis(m-tolyl)borate,
sodium tetrakis(2,4-dimetylphenyl)borate,
sodium tetrakis(3,5-dimethylphenyl)borate,
sodium tetrafluoroborate,
potassium tetrakis(pentafluorophenyl)borate,
potassium tetrakis(phenyl)borate,
potassium tetrakis(p-tolyl)borate,
potassium tetrakis(m-tolyl)borate,
potassium tetrakis(2,4-dimetylphenyl)borate,
potassium tetrakis(3,5-dimethylphenyl)borate, and
potassium tetrafluoroborate;
aluminum compounds such as
tri(n-butyl)ammonium tetrakis(p-tolyl)aluminate,
tri(n-butyl)ammonium tetrakis(m-tolyl)aluminate,
tri(n-butyl)ammonium tetrakis(2,4-dimetylphenyl) aluminate,
tri(n-butyl)ammonium tetrakis(3,5-dimethylphenyl) aluminate,
tri(n-butyl)ammonium tetrakis(pentafluorophenyl) aluminate,
N,N-dimethylanilinium tetrakis(p-tolyl)aluminate,
N,N-dimethylanilinium tetrakis(m-tolyl)aluminate,
N,N-dimethylanilinium tetrakis(2,4-dimetylphenyl) aluminate,
N,N-dimethylanilinium tetrakis(3,5-dimethylphenyl) aluminate,
N,N-dimethylanilinium tetrakis(pentafluorophenyl)aluminate,
triphenylcarbenium tetrakis(p-tolyl)aluminate,
triphenylcarbenium tetrakis(m-tolyl)aluminate,
triphenylcarbenium tetrakis(2,4-dimetylphenyl)aluminate,
triphenylcarbenium tetrakis(3,5-dimethylphenyl)aluminate,
triphenylcarbenium tetrakis(pentafluorophenyl)aluminate,
tropylium tetrakis(p-tolyl)aluminate,
tropylium tetrakis(m-tolyl)aluminate,
tropylium tetrakis(2,4-dimetylphenyl)aluminate,
tropylium tetrakis(3,5-dimethylphenyl)aluminate,
tropylium tetrakis(pentafluorophenyl)aluminate,
lithium tetrakis(pentafluorophenyl)aluminate,
lithium tetrakis(phenyl)aluminate,
lithium tetrakis(p-tolyl)aluminate,
lithium tetrakis( m-tolyl)aluminate,
lithium tetrakis(2,4-dimetylphenyl)aluminate,
lithium tetrakis(3,5-dimethylphenyl)aluminate,
lithium tetrafluoroaluminate,
sodium tetrakis(pentafluorophenyl)aluminate,
sodium tetrakis(phenyl)aluminate,
sodium tetrakis(p-tolyl)aluminate,
sodium tetrakis(m-tolyl)aluminate,
sodium tetrakis(2,4-dimetylphenyl)aluminate,
sodium tetrakis(3,5-dimethylphenyl)aluminate,
sodium tetrafluoroaluminate,
potassium tetrakis(pentafluorophenyl)aluminate,
potassium tetrakis(phenyl)aluminate,
potassium tetrakis(p-tolyl)aluminate,
potassium tetrakis(m-tolyl)aluminate,
potassium tetrakis(2,4-dimetylphenyl)aluminate, potassium tetrakis(3,5-dimethylphenyl)aluminate, and potassium tetrafluoroaluminate; and the like, but is not limited thereto.

The organoaluminum compound (c) used in the present invention is a compound represented by the general formula (3), and exemplified specifically by aluminum compounds such as trimethylaluminum, triethylaluminum, triisopropylaluminum, diisopropylaluminum chloride, isopropylaluminum dichloride, tributylaluminum, triisobutyl aluminum, diisobutylaluminum chloride, isobutylaluminum dichloride, tri(t-butyl)aluminum, di(t-butyl)aluminum chloride, t-butylaluminum dichloride, triamylaluminum, diamylaluminum chloride, amylaluminum dichloride, and the like, but is not limited thereto.

The catalyst may be prepared by mixing the metallocene compound (a), the ionizing ionic compound (b), and the organoaluminum compound (c) mentioned above, for example, in an inert solvent. The method of catalyst preparation is not limited thereto.

The amount of the ionizing ionic compound (b) is preferably in the range of from about 0.1 to 100 moles, more preferably from 0.5 to 30 moles, per mole of the metallocene compound (a).

The amount of the organoaluminum compound (c) is preferably in the range of from 1 to 10000 moles per mole of the metallocene compound (a), but is not limited thereto.

The α-olefin of 3 or more carbons used in the present invention includes propylene, 1-butene, 4-methyl-1-pentene, 1-hexene, 1-octene, and styrene, but is not limited thereto. The olefin may be a mixture of two or more thereof.

The process of polymerization includes solution polymerization processes and known high-temperature high-pressure processes.

In the solution polymerization, the polymerization temperature is preferably in the range of from 120° C. to 300° C., but is not limited thereto provided that the temperature is not lower than 120° C, and the polymerization pressure is preferably in the range of from atmospheric pressure to 200 kg/cm$^2$, but is not limited thereto.

In the high-pressure polymerization, the polymerization temperature is preferably in the range of from 120° C. to 300° C., but is not limited thereto provided that the temperature is not lower than 120° C., and the polymerization pressure is preferably in the range of from 500 to 3500 kg/cm$^2$, but is not limited thereto.

The present invention is described below in more detail by reference to Examples without limiting the invention thereto.

The procedures of polymerization, reaction, and solvent purification were conducted in an inert atmosphere. The solvent used in the reaction was purified, dried, and/or deoxidized preliminarily in a conventional method. The compounds used in the reactions were synthesized and identified in conventional methods.

The ethylene/α-olefin copolymers obtained in Examples were subjected to gel permeation chromatography (GPC) employing the apparatus of Model 150C made by Waters Co. with a column of TSK-GEL GMHHR-H(S) (made by Tosoh Corp.) and o-dichlorobenzene as the eluent at a temperature of 140° C. at a sample concentration of 7 mg in 10 ml of o-dichlorobenzene.

EXAMPLE 1

In a 1-liter reactor, was placed 600 ml of an aliphatic hydrocarbon (IP Solvent 1620, made by Idemitsu Petrochemical Co.) as the solvent. Thereto, 20 ml of hexene was added, and the reactor was kept at a temperature of 150° C. Ethylene was fed to the reactor at an ethylene pressure of 20 kg/cm.

Separately, in another vessel, 1 µmol of ethylenebis (indenyl)hafnium dichloride was dissolved in toluene, and thereto a solution of triisobutylaluminum in toluene (triisobutyl aluminum concentration: 20% by weight) was added in an amount of 250 µmol in terms of aluminum. The mixture was stirred for one hour. This mixture was added to a solution of 2 pmol of N,N-dimethylanilinium tetrakis (pentafluorophenyl)borate in 2 ml of toluene and the mixture was stirred for 10 minutes. The resulting mixture was introduced into the aforementioned reactor with the aid of nitrogen pressure.

After the introduction of the mixture into the reactor, the content in the reactor was stirred at 1500 rpm by keeping the temperature at 150° C. for one hour to allow copolymerization to proceed. The obtained reaction product was dried in vacuo at 100° C. for 6 hours. Thereby an ethylene/hexene copolymer was obtained in a yield of 31 g. The weight-average molecular weight (Mw) and other measured data are shown in Table 1.

Comparative Example 1

A copolymer was prepared in the same manner as in Example 1 except that ethylenebis(indenyl)zirconium dichloride was used in place of ethylenebis(indenyl)hafnium dichloride. The results are shown in Table 1.

EXAMPLE 2

A copolymer was prepared in the same manner as in Example 1 except that the polymerization was conducted at a temperature of 170° C. The results are shown in Table 1.

Comparative Example 2

A copolymer was prepared in the same manner as in Comparative Example 1 except that the polymerization was conducted at a temperature of 170° C. The results are shown in Table 1.

EXAMPLE 3

A copolymer was prepared in the same manner as in Example 1 except that bis(cyclopentadienyl)hafnium dichloride was used in place of ethylenebis(indenyl)hafnium dichloride. The results are shown in Table 1.

Comparative Example 3

A copolymer was prepared in the same manner as in Example 3 except that bis(cyclopentadienyl)zirconium dichloride was used in place of bis(cyclopentadienyl) hafnium dichloride. The results are shown in Table 1.

EXAMPLE 4

A copolymer was prepared in the same manner as in Example 3 except that isopropylidene(fluorenyl)-(cyclopentadienyl)hafnium dichloride was used in place of bis(cyclopentadienyl)hafnium dichloride. The results are shown in Table 1.

Comparative Example 4

A copolymer was prepared in the same manner as in Example 3 except that isopropylidene(fluorenyl)-(cyclopentadienyl)zirconium dichloride was used in place of bis(cyclopentadienyl)hafnium dichloride. The results are shown in Table 1.

EXAMPLE 5

A reactor for high-temperature high-pressure polymerization was employed for the polymerization. Ethylene and hexene were fed continuously with pressure to the reactor to keep the total pressure at 950 kg/cm$^2$ and the concentration of hexene at 34.0 mol %, and the reactor was stirred at 1500 rpm.

Separately, in another vessel, a solution of triisobutylaluminum in toluene was added to a solution of ethylenebis (indenyl)hafnium dichloride in toluene in an aluminum-to-hafnium mole ratio of 250:1. Further thereto, a solution of N,N-dimethylanilinium tetrakis(pentafluoro-phenyl)borate in toluene was added in a boron-to-hafnium mole ratio of 2:1 to prepare the catalyst solution.

The resulting catalyst solution was continuously fed into the reactor to allow the polymerization to proceed at the reactor temperature of 180° C. The results are shown in Table 2.

EXAMPLE 6

The polymerization was conducted in the same manner as in Example 5 except that the polymerization temperature was controlled to be at 175° C. and the hexene concentration was adjusted to 36.0 mol %. The results are shown in Table 2.

EXAMPLE 7

The polymerization was conducted in the same manner as in Example 5 except that the polymerization temperature was controlled to be at 165° C. and the hexene concentration was adjusted to 35.0 mol %. The results are shown in Table 2.

Comparative Example 5

The polymerization was conducted in the same manner as in Example 5 except that ethylenebis(indenyl)zirconium dichloride was used in place of ethylenebis(indenyl)hafnium dichloride, the polymerization temperature was controlled to be at 155° C., and the hexene concentration was adjusted to 32.0 mol %. The results are shown in Table 2.

The copolymerization of ethylene with α-olefin with a hafnium metal-containing ionic metallocene catalyst at a polymerization temperature of not lower than 120° C. enables copolymer production with high catalyst activity with high efficiency.

TABLE 1

| | | Polymerization conditions | | | | | | |
|---|---|---|---|---|---|---|---|---|
| | Metallocene compound used | Temperature (° C.) | Hexene (ml) | Pressure (kg/cm$^2$) | Yield (g) | Mw | Mw/Mn | Melting point (° C.) |
| Example 1 | Et(indenyl)$_2$HfCl$_2$ | 150 | 20 | 20 | 31 | 64400 | 2.5 | 102, 120 |
| Example 2 | Et(indenyl)$_2$HfCl$_2$ | 170 | 20 | 20 | 17 | 38500 | 2.6 | 107, 121 |
| Comparative Example 1 | Et(indenyl)$_2$ZrCl$_2$ | 150 | 20 | 20 | 40 | 20400 | 2.2 | 124 |
| Comparative Example 2 | Et(indenyl)$_2$ZrCl$_2$ | 170 | 20 | 20 | 28 | 16500 | 2.0 | 124 |
| Example 3 | Cp$_2$HfCl$_2$ | 150 | 20 | 20 | 18 | 57300 | 2.2 | 122 |
| Comparative Example 3 | CpZrCl$_2$ | 150 | 20 | 20 | 24 | 14200 | 1.9 | 126 |
| Example 4 | iPr(Cp)(fluorenyl)HfCl$_2$ | 150 | 20 | 20 | 4 | 170000 | 3.2 | 79, 119 |
| Comparative Example 4 | iPr(Cp)(fluorenyl)ZrCl$_2$ | 150 | 20 | 20 | 6 | 40000 | 2.5 | 118, 125 |

TABLE 2

| | Polymerization temperature (° C.) | metallocene | Brone compound | Aluminum compound | metallocen/B/Al (molar ratio) | metallocene catalyst concentraion (μmol/l) | Catalyst solution feed rate (cc/hour) |
|---|---|---|---|---|---|---|---|
| Example 5 | 180 | H-1 | B-1 | i-Bu$_3$Al | 1/2/250 | 650 | 165 |
| Example 6 | 175 | H-1 | B-1 | i-Bu$_3$Al | 1/2/250 | 650 | 290 |
| Example 7 | 165 | H-1 | B-1 | i-Bu$_3$Al | 1/2/250 | 650 | 180 |
| Comparative Example 5 | 165 | Z-1 | B-1 | i-Bu$_3$Al | 1/2/250 | 650 | 290 |

| | 1-Hexene (mol %) | Ethylene pressure (kg/cm$^2$) | Productivity (kg/hr) | Mw (×10$^4$) | MFR (g/10 min) | Density (g/cm$^3$) | Melting point (° C.) |
|---|---|---|---|---|---|---|---|
| Example 5 | 34.0 | 950 | 12.3 | 7.2 | 3.3 | 0.919 | 116 |
| Example 6 | 36.0 | 950 | 10.9 | 10.2 | 1.2 | 0.907 | 95, 114 |
| Example 7 | 35.0 | 950 | 11.0 | 10.5 | 1.1 | 0.912 | 98, 114 |
| Comparative Example 5 | 32.0 | 950 | 26.2 | 3.7 | 70.0 | 0.932 | 124 |

H-1: Et(indenyl)$_2$HfCl$_2$,
Z-1: Et(indenyl)$_2$ZrCl$_2$,
B-1: (Ph(Me)$_2$NH)(B(C$_6$F$_5$)$_4$)

What is claimed is:

1. A process for producing an ethylene/α-olefin copolymer by copolymerization of ethylene with an α-olefin having three or more carbons by use of an olefin polymerization catalyst at a polymerization temperature of not lower than 120° C., the olefin polymerization catalyst comprising, a) a metallocene compound, b) an ionizing ionic compound, and c) an organoaluminum compound: the metallocene compound (a) being a hafnium compound represented by the general formula (1):

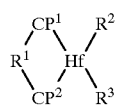
(1)

wherein $Cp^1$ and $Cp^2$ are independently a substituted or unsubstituted cyclopentadienyl group; a substituted or unsubstituted indenyl group, or a substituted or unsubstituted fluorenyl group; $R^1$ is a substituted or unsubstituted lower alkylene group or a dialkylsilanediyl group, $R^1$ crosslinking $Cp^1$ and $Cp^2$ together; $R^2$ and $R^3$ are independently halogen atoms, the ionizing ionic compound (b) being a compound which is capable of changing the metallocene compound (a) into a cationic form; and the organoaluminum compound (c) being represented by the general formula (3):

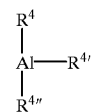
(3)

wherein $R^4$, $R^{4\prime}$ and $R^{4\prime\prime}$ are independently an alkyl group, wherein said ionizing ionic compound is a salt of an anion and a cation;
said cation is selected from the group consisting of tri(n-butyl)ammonium, N,N-dimethylanilinium, triphenylcarbenium, tropylium and lithium; and
said anion is selected from the group consisting of tetrakis (p-tolyl)borate, tetrakis(m-tolyl)borate, tetrakis(2,4-dimethylphenyl)borate, tetrakis(3,5-dimethylphenyl) borate and tetrakis(pentafluorophenyl)borate.

2. The process of claim 1, wherein the metallocene compound (a) is a hafnium compound represented by the general formula (1):

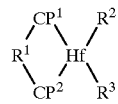
(1)

wherein $Cp^1$ is a substituted or unsubstituted cyclopentadienyl group; and $Cp^2$ is a substituted or unsubstituted fluorenyl group.

* * * * *